May 2, 1961  A. C. RAND, JR  2,982,711
SYSTEM FOR UNLOADING REACTORS
Filed Feb. 3, 1947  2 Sheets-Sheet 1

Witness:
Walter S. Schlegel, Jr.

INVENTOR.
Alonzo C. Rand, Jr.
BY
Robert A. [Saunders]
Attorney.

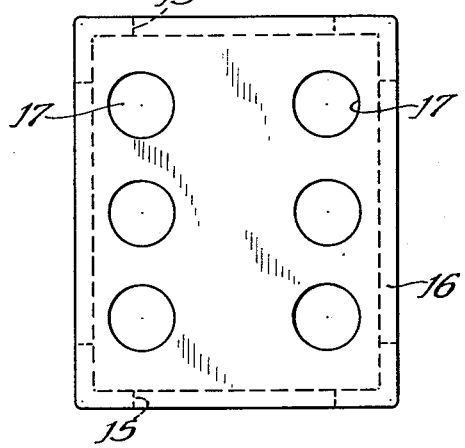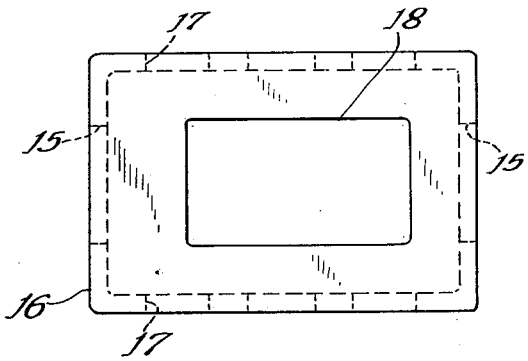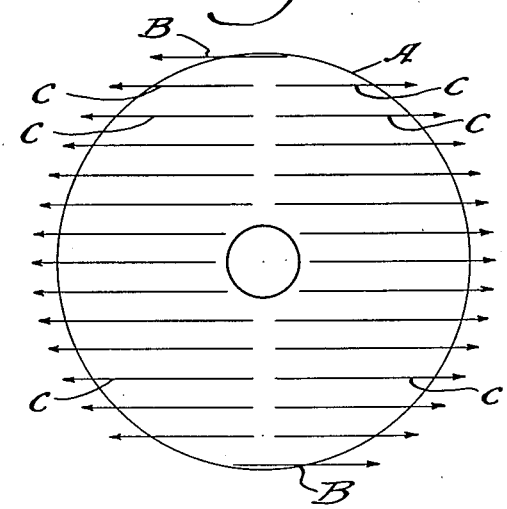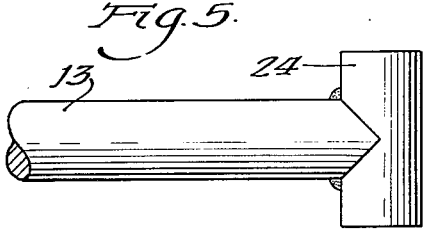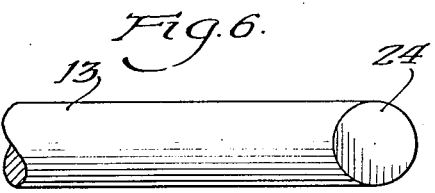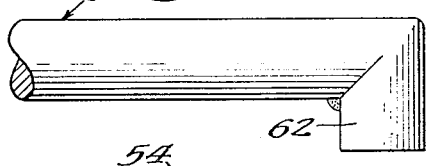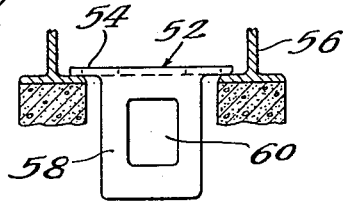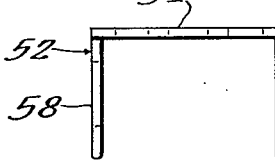

United States Patent Office 2,982,711
Patented May 2, 1961

2,982,711

SYSTEM FOR UNLOADING REACTORS

Alonzo C. Rand, Jr., Stoneham, Mass., assignor to the United States of America as represented by the United States Atomic Energy Commission Filed Feb. 3, 1947, Ser. No. 725,978

4 Claims. (Cl. 204—193.2)

This invention relates to unloading devices and more particularly to a novel system for unloading neutronic reactors.

The invention relates particularly to fluid cooled reactors of the type disclosed in a co-pending Daniels application, Serial Number 713,660, filed December 3, 1946. However, it will be understood that the invention is broadly applicable to the unloading of neutronic reactors in general such as certain reactors shown in the copending appliction of Fermi and Szilard, Serial No. 568,904, filed December 19, 1944, now U.S. Patent No. 2,708,656.

A general object of the invention is to design a novel system for selectively unloading the channels of such a reactor without the necessity of providing independent valves for the respective channels.

Another object of the invention is to provide means for unloading the reactor channels without obstructing the flow of coolant therethrough adapted to adsorb the heat of the nuclear fission chain reaction.

Still another object of the invention is to provide a novel apparatus for unloading a neutronic reactor and which is simple and economical in construction and comprises no parts which may become broken or inoperative to prevent operation of the system.

The foregoing and other objects and advantages of the invention will become readily apparent from a consideration of the following specification and the accompanying drawings, wherein:

Figs. 3 and 4 are respectively a top plan view and a side elevation of one of the novel support blocks shown in Fig. 1;

Figs. 5 and 6 are respectively a top plan view and side elevation of the drawbar shown in Fig. 1;

Fig. 7 is a reduced fragmentary sectional view corresponding to Fig. 2 but showing a modification of the apparatus;

Fig. 8 is a side elevation of the support block shown in Fig. 7;

Fig. 9 is a fragmentary top plan view of a modified drawbar for use with the embodiment of Figs. 7 and 8; and Fig. 10 is a schematic plan layout diagrammatically illustrating the system as applied to a cylindrical reactor.

Figure 1:
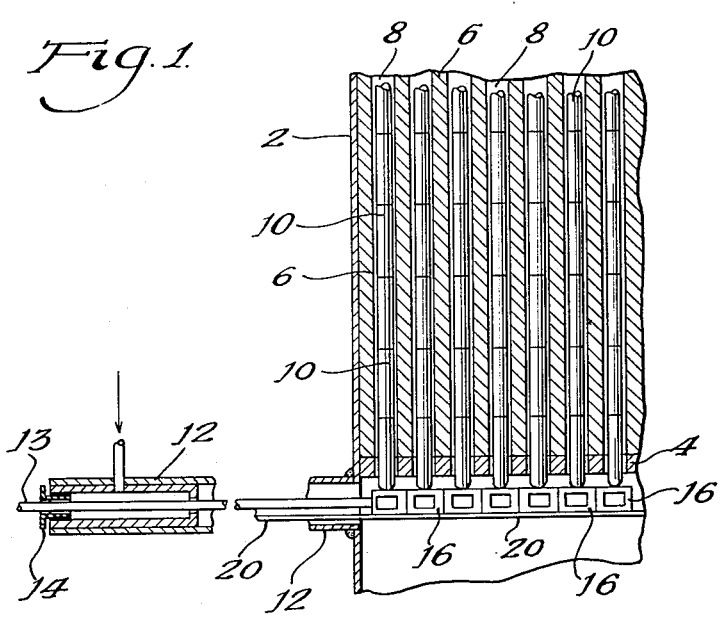
Fig. 1 is a fragmentary vertical sectional view through a neutronic reactor embodying the invention.
Figure 2:
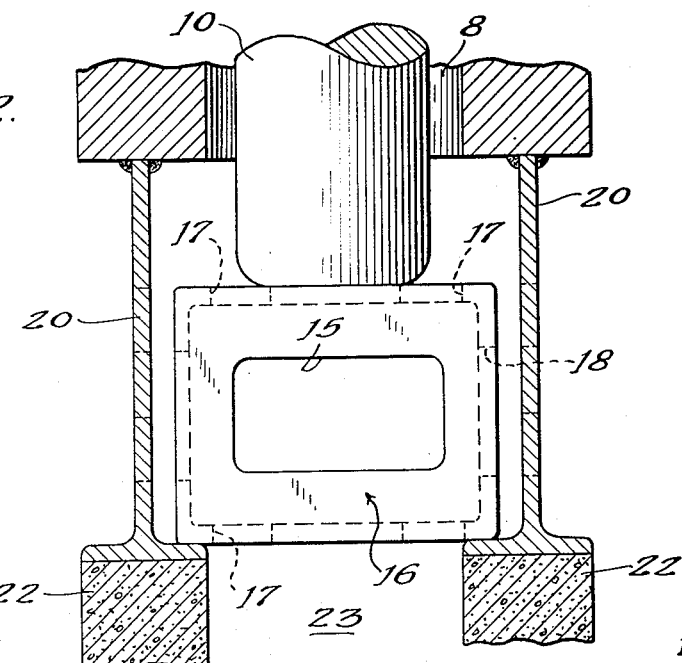
Fig. 2 is an enlarged vertical sectional view taken through portions of the reactor in a vertical plane approximately perpendicular to the plane of Fig. 1.

Describing the invention in detail and referring first to the embodiment shown in Figs. 1 to 6, the reactor fragmentarily shown in Fig. 1 comprises a chamber or container 2 with a floor plate 4 supporting a mass 6 of neutron moderator such as beryllium oxide or graphite with vertical channels 8 extending therethrough and containing columns of vertically stacked members 10.

The members 10 may be in the form of rods or tubes of comingled oxides of uranium and beryllium as discussed in the above-mentioned application; however, the particular construction of these members is of no significance in the present invention. At least a portion of the members 10 contain fissionable material in sufficient concentration to sustain a nuclear fission chain reaction.

The heat of this reaction is adsorbed by a fluid coolant such as helium, water or steam conveyed to the tank 2 through inlet lines, one of which is shown at 12 (Fig. 1). Each line 12 is provided with a conventional fluid tight fitting 14 accommodating reciprocal movement of a coupling rod or drawbar 13 which extends through the aligned end openings 15 of a row of hollow support blocks 16 having top and bottom apertures 17 and side apertures 18 (Figs. 2–4) accommodating flow of the before-mentioned coolant fluid so that the same may freely flow through the channels 8.

The support blocks 16 are supported by tracks 20 which are supported by a foundation 22 (Fig. 2) having vertical apertures 23 aligned with the channels 8.

It will be understood that during or subsequent to the operation of a reactor of this type, it is frequently desirable to remove the members 10 within one or more of the channels 8, particularly in view of the fact that the neutron density within such a reactor is normally greatest at the center thereof and increases toward the periphery thereof, thus causing the fuel or fissionable material within the members 10 closest to the center of the reactor to be consumed at a relatively great rate. Also, under some conditions, wherein the members 10 contain material adapted to be converted to a radioactive isotope by nuclear reaction under neutron bombardment, it is frequently desirable to remove the members from one or more of the channels without disturbing the other members.

Removal of the members 10 is accomplished by selectively engaging the drawbar 13 with any one of the blocks 16 in the row through which it may be extended. The bar is coupled with the selected block by rotating the T-shaped head 24 of the drawbar to a vertical position within the block. The bar is then retracted to move the interlocked block as well as the blocks between the interlocked block and the periphery of the reactor, thus allowing the members within the opened channel or channels 8 to fall between the tracks 20 into a handling chamber (not shown) beneath the reactor where the members 10 are loaded into lead coffins (not shown) for aging prior to separation of radioactive isotopes therefrom as will be readily understood by those skilled in the art. The tracks 20 extend into the conduit 12 so that the entire row of blocks 16 or any desired number thereof may be withdrawn from supporting relationship with the associated members 10.

The row of blocks 16 may then be pushed to their original position by the drawbar 13 and the empty channel or channels 8 may be reloaded as desired.

Referring now to Fig. 10 which is a schematic plan layout showing the novel system applied to a cylindrical reactor within the area A, the blocks are arranged in horizontal rows along the arrows of this figure. It may be noted that the row at each end of the reactor being relatively short is removed in the direction of the single arrow B. However, the rows between these single arrows are each divided in half, the respective halves of each row being removed in the direction of the two aligned arrows C. Thus it will be understood that for each arrow B and each arrow C in Fig. 10 there is provided a fluid conduit and associated mechanism as indicated at 12, 13 and 14 in Fig. 1. For the purpose of clarity and to avoid duplication, the arrangement of these rows of support blocks and associated actuated mechanism is illustrated diagrammatically in Fig. 10.

Referring now to Figs. 7 to 9, it may be noted that the support member indicated at 52 therein is in the form of a flat perforated plate 54 supported by the associated tracks 56 and provided with depending end plates or walls 58 having apertures 60 therethrough to accommodate passage of the associated drawbar and reactor coolant. Preferably a modified drawbar fragmentarily illustrated at 60 (Fig. 9) is utilized with the modified form of support member shown in Figs. 7 and 8. Thus it will be understood that the drawbar is inserted through the openings 60 of the support member 52 until the bar is between the end plates 58 of the member 52 which is to be retracted. Thereupon the bar 60 is rotated so that the nose 62 thereof is disposed downwardly so as to engage the lower margin of the opening 60 in the selected member 52. Thereupon the drawbar may be retracted to withdraw the member 52 and the members outwardly thereof toward the periphery of the reactor to open the desired channel or channels therein as in the previously described embodiment.

It will be understood that the above-described embodiments of the invention are merely by way of illustration and not limitation inasmuch as other modifications will be readily apparent to those skilled in the art without departing from the spirit of the invention or the scope of the appended claims.

What is claimed is:

1. In a system of the class described, a container, a structure therein comprising a plurality of passages arranged in a row, a plurality of separable members in abutment with each other at one end of said passages for closing the same, a fluid line connected to said vessel, fluid passage means through said members affording flow of fluid between said line and said passages, and a rod extending through said line and through aligned openings in said members, said rod having thereon means for selectively engaging the rod with respective members whereby upon retraction of said rod in said line a predetermined number of said members are retracted with said rod.

2. Unloading mechanism for a structure containing a plurality of substantially vertical columns capable of vertical movement, comprising rows of separable abutting members associated with said columns, each member affording support for one of the columns at the lower end thereof, a plurality of aligned openings through the members of each row defining a substantially horizontal passage therethrough, and means for moving the members from their supporting relationship with respective columns comprising an element horizontally moveable through the passage in each row and selectively engageable with the respective members thereof for moving the same longitudinally thereof.

3. In combination, a neutronic reactor comprising means for sustaining a nuclear fission chain reaction including a reactive composition containing a plurality of spaced columns of fissionable material arranged in rows, means restraining the columns of each row against substantial horizontal movement longitudinally thereof, support means for said columns comprising rows of separable blocks each supporting one column, a substantially horizontal passage through each row of blocks, and means for unloading said columns from said composition comprising means moveable through the passages of each row of blocks for selectively engaging the respective blocks thereof to move the same out of supporting relationship with respect to the associated columns.

4. In combination, a structure comprising a row of vertical channels, a row of separable abutting members beneath respective channels, material in said channels supported by said members, actuating means for said members comprising a reciprocal rod extending through aligned openings therethrough, and means for selectively engaging said rod with any one of said members for moving that member and the members at one side thereof out of supporting relationship with one or more of the associated passages.

References Cited in the file of this patent

UNITED STATES PATENTS

| 384,409 | Woodcock | June 12, 1888 |
| 1,503,072 | Spooner et al. | July 29, 1924 |
| 2,309,008 | Pease | Jan. 19, 1943 |

FOREIGN PATENTS

| 861,390 | France | Oct. 28, 1940 |
| 233,011 | Switzerland | Oct. 2, 1944 |